No. 782,433. PATENTED FEB. 14, 1905.
H. E. ASHLEY.
TEMPERATURE INDICATING SPOON.
APPLICATION FILED MAY 18, 1904.
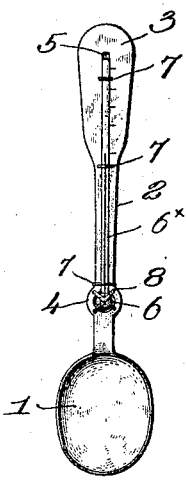
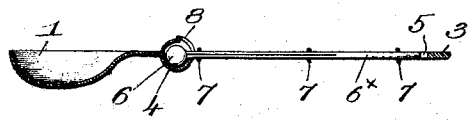
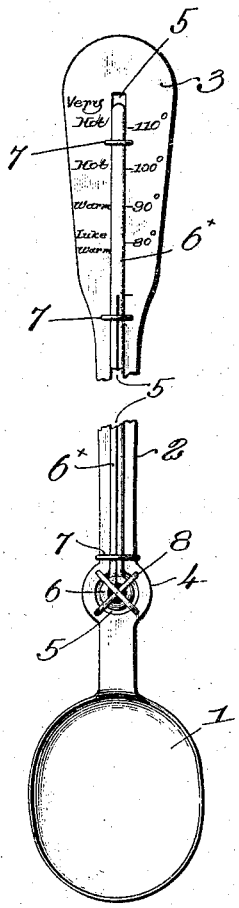

No. 782,433. Patented February 14, 1905.

UNITED STATES PATENT OFFICE.

HARRISON EVERETT ASHLEY, OF NEW BEDFORD, MASSACHUSETTS.

TEMPERATURE-INDICATING SPOON.

SPECIFICATION forming part of Letters Patent No. 782,433, dated February 14, 1905.

Application filed May 18, 1904. Serial No. 208,598.

*To all whom it may concern:*

Be it known that I, HARRISON EVERETT ASHLEY, a citizen of the United States, and a resident of New Bedford, county of Bristol, State of Massachusetts, have invented an Improvement in Temperature-Indicating Spoons, of which the following description, in connection with the accompanying drawings, is a specification, like numerals on the drawings representing like parts.

This invention has for its object the production of a spoon provided with thermometric means to indicate the temperature of the liquid or semiliquid material stirred or agitated by the same.

In the preparation of various hot drinks or beverages it is very desirable for the person mixing the same, as well as the person who drinks the mixture, to have a definite idea as to the temperature thereof in order that the mixture may be properly made and palatable and that the drinking of the mixture may not be attended with pain or injury. At present this is left wholly to the skill or judgment of the person who prepares the mixture, who guesses at the temperature by the heat imparted to the hand during manipulation.

By my present invention the temperature of the mixture is indicated accurately at a point plainly visible and conveniently accessible, so that the operator knows exactly what he is doing.

In accordance with my present invention I provide a mixing or stirring spoon comprising an elongated handle and bowl portion and provided with a temperature-indicator so arranged that the portion thereof responsive to changes in temperature is close to the bowl. A scale, denoted either by degrees or by names—such as "Lukewarm," "Hot," "Very Hot"—or by both, is formed on the handle at or near its upper end, so that at a glance the operator or the user can discern the temperature of the mixture. The portion of the thermometric device responsive to changes in temperature is so located with relation to the bowl that such portion will be immersed in the mixture when the same is stirred in a cup or glass.

Figure 1 is a plan view of a spoon provided with a thermometric indicator embodying one form of my invention. Fig. 2 is a longitudinal central section of the spoon, the thermometer being shown in elevation; and Fig. 3 is an enlarged plan view similar to Fig. 1, but centrally broken out and showing more clearly the details of construction.

The spoon is herein shown as having a bowl 1 and an elongated handle 2, broadened at its outer end at 3, of the general form used by druggists and others in mixing hot drinks. In the present embodiment of my invention the handle is widened and concaved at 4 near the bowl to form a cup-like bulb-seat, and a longitudinal slot 5 is made in the handle, extending from the seat well toward its outer end. A thermometer comprising a bulb 6 and stem $6^x$ is applied to the spoon, the bulb 6 resting in the seat and the stem entering the longitudinal slot 5, as clearly shown in Fig. 2. Suitable clips or bands 7 on the handle cross the stem and hold the same in place, and a basket-like guard 8 on the handle extends over the bulb and protects it from injury, the guard and clips attaching the thermometer to the spoon. The bulb is so located that when the spoon is used in stirring a mixture the latter will immerse the bulb and will thereby cause the mercury to rise in the stem $6^x$ in proportion to the temperature of the mixture. In order to conveniently indicate such temperature to the operator, a scale is made on the broad part 3 of the spoon-handle, and I have shown the temperature as indicated at one side of the stem by numbers denoting degrees, as "80°," "90°," &c., while on the opposite side corresponding words are shown, as "Lukewarm," "Warm," &c.

The use of the device will be obvious from the foregoing description in connection with the drawings.

Having fully described my invention, what I claim as new, and desire to secure by Letters Patent, is—

1. A spoon comprising a bowl and an attached, elongated handle having a broadened, flat outer end, and provided with a concave enlargement to form a bulb-seat adjacent the bowl, and longitudinally slotted from said bulb-seat outward, a thermometer attached to the spoon, and having its bulb located in the seat, and its stem extended within the longitudinal slot, a guard for the bulb, and an indicating-scale on the broadened and flat outer end of the handle.

2. A device of the class described, comprising a spoon having a bowl and an integral handle, the latter having a concave bulb-seat formed therein adjacent the bowl, and an elongated slot leading from the seat along the handle, a thermometer attached to the spoon having its bulb in the seat, and its stem located within the longitudinal slot, an indicating-scale formed directly on the spoon-handle, and means to retain the thermometer in place.

In testimony whereof I have signed my name to this specification in the presence of two subscribing witnesses.

HARRISON EVERETT ASHLEY.

Witnesses:
STANISLAS T. BENOIT,
O. H. BENOIT.